United States Patent [19]

Zardi et al.

[11] Patent Number: 5,585,074

[45] Date of Patent: Dec. 17, 1996

[54] METHOD AND APPARATUS FOR IN-SITU MODERNIZATION OF A HETEROGENEOUS EXOTHERMIC SYNTHESIS REACTOR, PARTICULARLY OF THE SO-CALLED KELLOGG TYPE

[75] Inventors: Umberto Zardi, Breganzona, Switzerland; Giorgio Pagani, Milan, Italy; Ermanno Filippi, Vagallo, Switzerland

[73] Assignee: Ammonia Casale S.A., Lugano-Besso, Switzerland

[21] Appl. No.: 366,103

[22] Filed: Dec. 29, 1994

[51] Int. Cl.⁶ .................. B01J 8/04; C01C 1/00
[52] U.S. Cl. .......... 422/191; 422/148; 422/192; 423/360
[58] Field of Search .................. 422/148, 191, 422/192, 194, 195, 198, 200, 201; 423/360, 361, 659

[56] References Cited

U.S. PATENT DOCUMENTS

| | | | |
|---|---|---|---|
| 4,755,362 | 7/1988 | Zardi | 422/148 |
| 4,942,022 | 7/1990 | Kasai et al. | 422/201 |
| 4,963,338 | 10/1990 | Zardi et al. | 423/360 |
| 5,006,316 | 4/1991 | Zardi et al. | 423/148 |
| 5,171,543 | 12/1992 | Zardi et al. | 422/148 |
| 5,184,386 | 2/1993 | Zardi et al. | 422/148 |
| 5,254,316 | 10/1993 | Zardi et al. | 29/401.1 |

Primary Examiner—Virginia Manoharan
Assistant Examiner—Christopher Kim
Attorney, Agent, or Firm—Sughrue, Mion, Zinn, Macpeak & Seas

[57] ABSTRACT

A method for "in-situ" modernization of a reactor for effecting heterogeneous exothermic synthesis reactions, especially of the so-called Kellogg type, including the preliminary step of providing at least three radial or axial-radial catalyst beds (11, 12, 13), includes the steps of providing a first gas/gas heat exchanger (18) between the first (11) and second (12) catalyst beds and a second gas-gas heat exchanger (29) in the third catalyst bed (13). Thanks to the provision of two exchangers (18, 29) for cooling of the gases flowing between the catalyst beds by means of indirect heat exchange, the present modernization method allows to achieve a reactor with a high conversion yield.

22 Claims, 2 Drawing Sheets

METHOD AND APPARATUS FOR IN-SITU MODERNIZATION OF A HETEROGENEOUS EXOTHERMIC SYNTHESIS REACTOR, PARTICULARLY OF THE SO-CALLED KELLOGG TYPE

DESCRIPTION

1. Field of Application

The present invention relates to a method for in-situ modernization of a heterogeneous exothermic synthesis reactor, particularly of the so-called Kellogg type, including an external shell in which a plurality of superimposed catalyst beds in mutually spaced relationship are supported.

More specifically, the present invention relates to a modernization method of the type comprising the following preliminary steps:

- providing a first and a second catalyst beds in an upper portion of said shell and at least a third bed in a lower portion thereof,
- equipping each of said beds with means for feeding thereto a radial or axial-radial flow of reagent gases, and
- providing a first gas/gas heat exchanger between said first and second catalyst beds.

In the description given below and in the following claims, the term: "in-situ" modernization is understood to mean the on-site modification of a pre-existing reactor in order to improve its performance and obtain e.g. a production capacity and/or a conversion yield comparable to those of a newly-built reactor.

In the terminology of the field, this type of modernization is also termed retrofitting or revamping.

As is known, in the field of heterogeneous exothermic synthesis in general and, more particularly, in ammonia and methanol production, it is necessary to satisfy a two-fold need, i.e. on the one hand increase the production capacity of pre-existing synthesis reactors and, on the other hand, achieve an improvement of conversion yield and a reduction of the reactor energy consumption.

2. Known Art

For the purpose of satisfying the above-identified need, the so-called technique of modernizing the pre-existing reactors, aiming at avoiding a costly replacement of the latter and achieving at the same time the maximum conversion compatible with the available catalyst volumes, has become increasingly accepted.

A first modernization method, based on the replacement of the catalyst beds of the pre-existing reactor with new beds of the high-yield radial or axial-radial type, is described e.g. in U.S. Pat. No. 4,755,362 by the same Applicant.

In accordance with said method, the intermediate coolings between the various catalyst beds—necessary to promote the exothermic synthesis reaction from a thermodynamic viewpoint—are performed in the modernized reactor by mixing with cold reagent or "quench" gases.

But cooling by direct mixing with unreacted gases entails an unavoidable dilution effect, with a corresponding decrease in the concentration of the reaction products in the gases leaving the reactor and, consequently, of the final conversion yield.

In accordance with U.S. Pat. No. 4,963,338 and 5,254,316 it was sought to remedy this drawback by providing in the modernised reactor at least one indirect cooling of the gases flowing between the catalyst beds.

This indirect cooling is performed in a gas-gas heat exchanger positioned in either an intermediate catalyst bed or in both the uppermost catalyst beds.

Although by these modernization methods an increase in production capacity and a reduction in energy consumption are obtained, the difficulty of modifying the pre-existing reactor structure has not allowed, on the other hand, to eliminate or at least further reduce the number of intermediate quench coolings.

This drawback is particularly difficult to overcome in the case of heterogeneous synthesis reactors of the so-called Kellogg type, since their structural characteristics impose during modernization a series of limiting factors which make extremely difficult the insertion of additional heat exchangers for indirect cooling of the gases flowing between the catalyst beds.

A first factor making difficult the insertion of additional heat exchangers between catalyst beds, is linked to the impossibility of adapting the height of the catalyst beds to the design height of the exchanger.

The position of the bottom plates supporting the catalyst beds, in fact, cannot be changed at will without incurring serious risks of structural yielding.

A second factor making difficult the insertion of additional heat exchangers between catalyst beds, is linked to the limited size of the pre-existing manholes, which imposes an insurmountable limit to the diameter of the exchanger which can be inserted between the catalyst beds.

Just because of these limiting factors, the problem of achieving a further increase in the conversion yield by appropriately reducing the number of intermediate indirect—or "quench"—coolings has not yet been solved by the modernization methods proposed by the known art.

SUMMARY OF THE INVENTION

The technical problem underlying the present invention is, therefore, that of providing a method for modernizing a heterogeneous exothermic synthesis reactor, particularly but not exclusively of the so-called Kellogg type, which allows to obtain a further increase of the conversion yield over that obtainable by the modernization methods in accordance with the above-mentioned prior art.

Said problem is solved by a method of the type set forth above, which further comprises the following steps:

- providing means for indirect cooling of the gases flowing between said first and second catalyst beds in the first heat exchanger,
- providing a second gas-gas heat exchanger in said third catalyst bed, and
- providing means for indirect cooling of the gases flowing between said second and third catalyst beds in the second heat exchanger.

Advantageously, the method of the present invention allows to achieve—while leaving unaltered the external structure—a more efficient reactor from the thermodynamic viewpoint, thanks to the elimination of the dilution effects resulting from the intermediate "quench" cooling of the gases flowing between the catalyst beds.

In a preferred and advantageous embodiment of the present modernization method, said gas-gas heat exchangers for indirect cooling of the reaction products are arranged in and coaxially with the catalyst beds, exploiting the spaces centrally defined within the beds by the annular catalyst-supporting baskets.

In this manner, both the thermodynamic configuration of the reactor and the use of the available volumes, which are advantageously employed for housing either the catalyst or the heat exchangers designed for indirect gas cooling between the catalyst beds, are optimised.

In a preferred embodiment, said first and second gas-gas heat exchangers are provided in the upper catalyst beds and, respectively, in the lower catalyst bed and are interconnected in series on the tube side.

In accordance with this embodiment, the first heat exchanger cools the reaction products leaving the first catalyst bed by means of a cooling fluid consisting essentially of a gaseous mixture comprising gaseous reagents partly fed from the outside and partly coming from the underlying second exchanger in which they are partially heated.

Thanks to this feature, the method of the present invention allows to achieve an extremely flexible and effective temperature control of the gases fed to both the second and third catalyst beds, by a simple adjustment of the flow rates of the cold gaseous reagents making up said mixture.

In accordance with another aspect of the present invention, it is also made available a method of performing heterogeneous exothermic synthesis reactions with high conversion yield of comprising the following steps:

feeding gaseous reagents to a synthesis reactor in which at least three superimposed catalyst beds in mutually spaced relationship are supported, reacting said gaseous reagents in said catalyst beds, and withdrawing from the synthesis reactor the reaction products leaving the last one of said catalyst beds, feeding the reaction mixture leaving the first catalyst bed to a first heat exchanger extending coaxially in said first and second catalyst beds, cooling said reaction mixture in said first heat exchanger, feeding the cooled reaction mixture thus obtained to the second catalyst bed, feeding the reaction mixture leaving the second catalyst bed to a second heat exchanger extending coaxially in said last catalyst bed, cooling said reaction mixture in said second heat exchanger, and feeding the cooled reaction mixture thus obtained to the last one of said catalyst beds.

The characteristics and advantages of the present invention are set forth in the description of an example of implementation of a modernization method in accordance with the present invention, given hereinbelow by way of non-limiting illustration with reference to the annexed drawings.

DETAILED DESCRIPTION OF A PREFERRED EMBODIMENT

Figure 1:
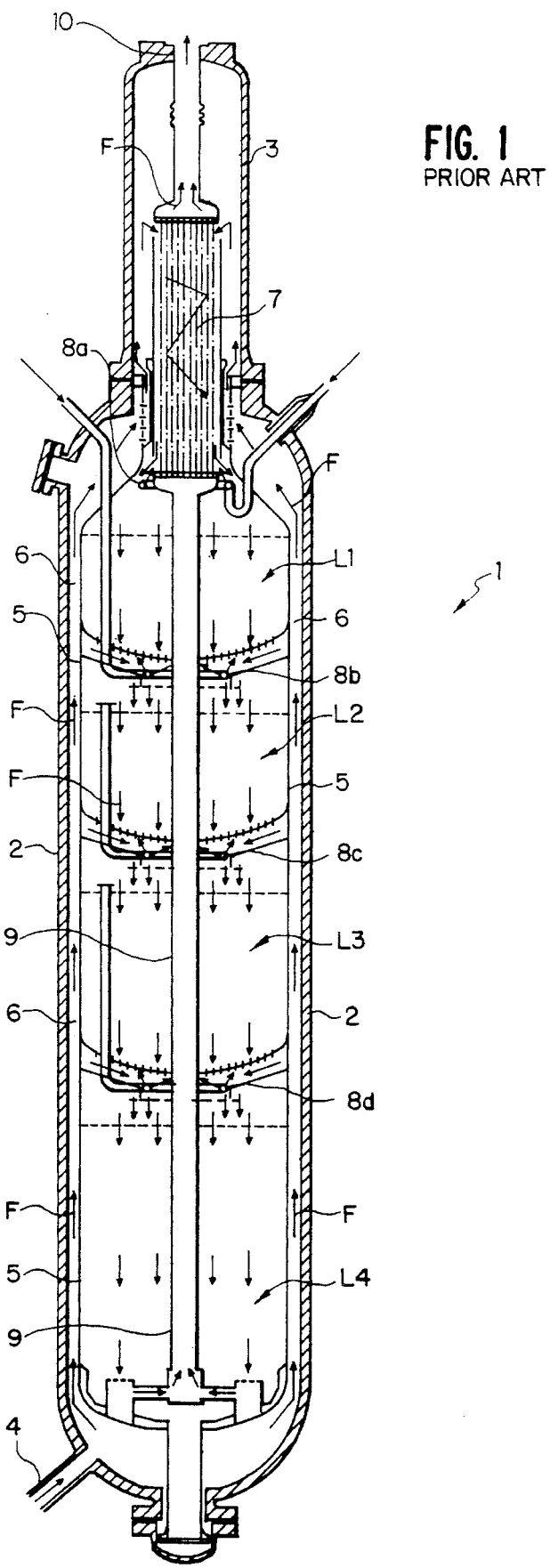
FIG. 1 shows a longitudinal cross-section of a conventional Kellogg reactor for effecting heterogeneous exothermic synthesis reactions.

With reference to FIG. 1, reference number 1 indicates a reactor of the so-called Kellogg type for effecting heterogeneous exothermic synthesis reactions at high pressure e.g. for the production of ammonia.

The reactor 1 comprises a tubular vessel or shell 2 closed on top by a bell-shaped cover 3 and equipped at the bottom with an opening 4 for feeding the reagent gases.

A cartridge 5, comprising four catalyst beds L1, L2, L3 and L4 superimposed and in mutually spaced relationship, is supported in a known manner in the shell 2.

An essentially annular airspace 6, defined between the cartridge 5 and the shell 2, extends between the opening 4 and a gas-gas heat exchanger 7 designed for preheating the reagent gases which is in turn conventionally supported within the cover 3.

The reactor 1 also comprises a plurality of toroidal distributors 8a–8d for feeding cold or quenching reagent gases upstream of each of the catalyst beds L1–L4.

A duct 9, extending coaxially within the catalyst beds L1–L4, is provided in the reactor 1 for feeding the reaction products leaving the lowermost catalyst bed L4 to the gas-gas heat exchanger 7, which cools them before their final withdrawal through an opening 10.

In FIG. 1, the arrows F indicate the various paths flown by the gases along the airspace 6 and through the catalyst beds L1–L4 and the heat exchanger 7.

Figure 2:
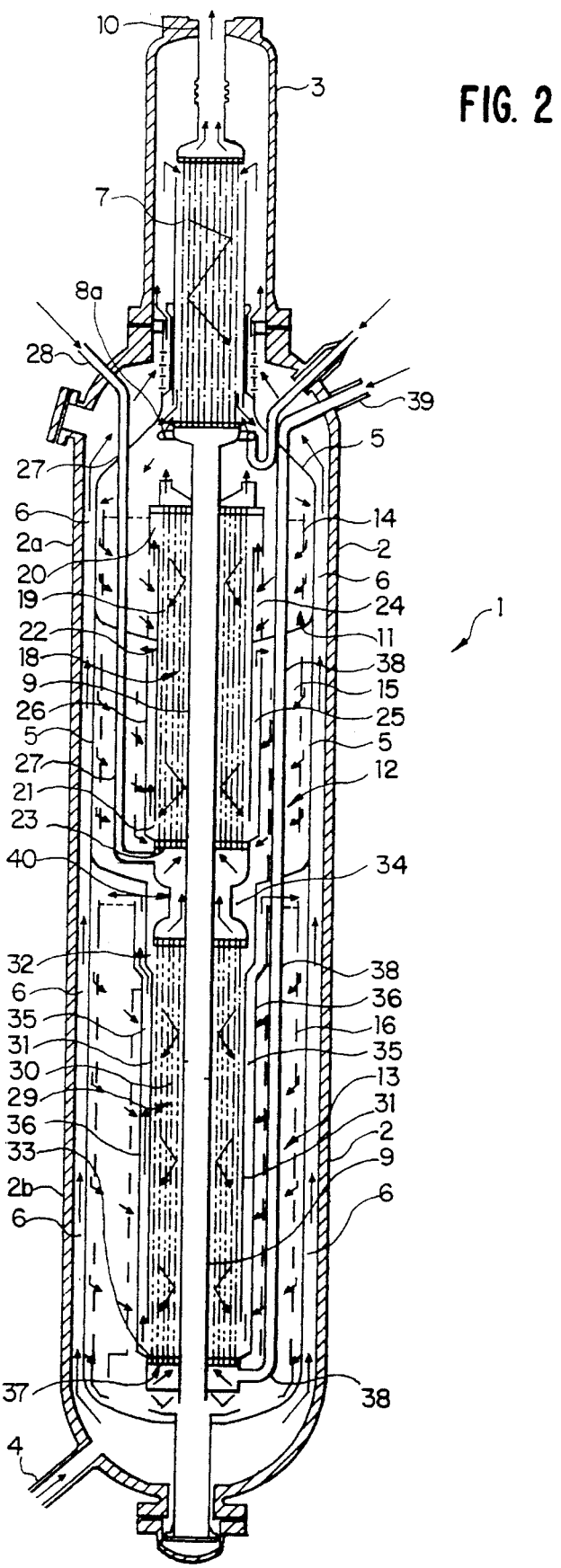
FIG. 2 shows a longitudinal cross-section of a reactor obtained by modifying the Kellogg reactor of FIG. 1 by the modernization method in accordance with the present invention.

FIG. 2 shows a heterogeneous exothermic synthesis reactor obtained by modifying the reactor of FIG. 1 in accordance with a modernization method of the present invention.

In said figure, the details of reactor 1 structurally and functionally equivalent to those illustrated in FIG. 1 are indicated by the same reference numbers and are not further described.

In accordance with a preliminary step of the present method, the cartridge 5 of the reactor 1 is previously emptied of its content and is equipped with axial-radial catalyst beds 11, 12 and 13.

In a particularly advantageous embodiment of the method of the present invention, an optimal distribution of the catalyst volumes is achieved by arranging the catalyst beds 11 and 12 in an upper portion 2a of the shell 2 by using the pre-existing supports of the original beds L1 and L2, while the catalyst bed 13 occupies a lower portion 2b of the shell 2 in which the beds L3 and L4 were previously housed.

Each of said catalyst beds 11–13 is also equipped with known means for achieving a radial or axial-radial gas flow through them. Said means may comprise e.g. annular catalyst baskets 14, 15 and 16 equipped with opposed appropriately perforated gas-permeable walls for gas inlet and outlet.

Means of this type for providing an axial-radial gas flow in the catalyst beds are described e.g. in U.S. Pat. 4,755,362 the description of which is herein incorporated by reference.

In another step of the present modernization method, a gas-gas heat exchanger 18 is arranged between the catalyst beds 11 and 12 housed in the upper portion 2a of the shell 2.

Preferably, the heat exchanger 18 is arranged in and coaxially with the beds 11 and 12 making use of the openings defined by the annular baskets 14 and 15 in the centre of each of said beds.

According to the present invention, means for indirect cooling of the gases flowing between the upper catalyst beds 11 and 12 are arranged in the heat exchanger 18.

Said means comprises a tube nest 19 housed in a tubular shell 22 and equipped with opposed gas inlet and outlet openings 20 and 21 on the shell side, as well as means for feeding cold gaseous reagents to a gas inlet opening 23 on the tube side of the heat exchanger 18.

According to the invention, the gas inlet opening 20 in the tube nest 19 is in fluid communication with the catalyst bed 11 through an annular airspace 24 defined between the outer wall of the tubular shell 22 and the gas outlet wall of the basket 14.

The gas outlet opening 21 from the tube nest 19 is in turn in fluid communication with the catalyst bed 12 through a second annular airspace 25, defined between the tubular shell 22 and a coaxial wall 26 extending between the tube nest 19 and the basket 15.

In the embodiment illustrated, the means for feeding the cold gaseous reagents to the tube side opening 23 of the exchanger 18 comprises a duct 27 extending between said opening and an inlet opening 28 for cold gaseous reagents.

In another step of the present modernization method, a second gas-gas heat exchanger 29 is arranged in the third catalyst bed 13 housed in the lower portion 2b of the she 11 2.

Preferably, the heat exchanger 29 is arranged in and coaxially with the bed 13 by exploiting the opening defined by the annular basket 16 in the centre of said bed.

According to the invention, means for indirect cooling of the gases flowing between the catalyst beds 12 and 13 are arranged in the heat exchanger 29.

Said means comprises a tube nest 30 housed in a tubular shell 31 and equipped shell-side with opposed gas inlet and outlet openings 32 and 33, as well as means for feeding the cold gaseous reagents to a tube side gas inlet manifold 37 of the exchanger 29.

According to the invention, the gas inlet opening 32 is in fluid communication with the catalyst bed 12 through an essentially annular gas passage 34, extending coaxially with the reactor 1 between the bed 12 and the tube nest 30.

The gas outlet opening 33 is in turn in fluid communication with the catalyst bed 13 through an annular airspace 35, defined between the tubular shell 31 and a coaxial wall 36 extending between the tube nest 30 and the basket 16.

In the example illustrated, the means for feeding the cold gaseous reagents to the manifold 37 comprises one or more ducts 38 extending between a cold gaseous reagent inlet opening 39 and the inlet opening of said manifold.

In accordance with an advantageous feature of the present invention, the gas-gas heat exchangers 18 and 29 are mutually connected in series on the tube side, e.g. through a labyrinth joint 40.

At the end of the above steps, gas paths are defined within the reactor 1 which allow to cool the hot reaction products leaving the catalyst beds 11 and 12 by using exclusively an indirect heat exchange.

By means of the thus modernised reactor 1, it is possible to perform heterogeneous exothermic synthesis reactions with a high conversion yield in the following manner.

The gaseous reagents, fed to the reactor 1 through the opening 4, pass into the airspace 6, are preheated in the heat exchanger 7 and are then fed to the first catalyst bed 11.

The temperature of the gaseous reagents fed to the first catalyst bed 11 is controlled at the desired values by a first portion of cold gaseous or "quench" reagents fed to the reactor 1 by means of the distributor 8a and by a second portion of gaseous reagents preheated in the heat exchangers 18 and 29 as explained hereinbelow.

The reaction mixture leaving the catalyst bed 11, which is crossed by a centripetal axial-radial flow, is then collected in the airspace 24 and fed to the heat exchanger 18 in which it is cooled by indirect heat exchange.

According to the present invention, the partial cooling of said mixture, flowing shell side in the heat exchanger 18, takes place by means of a colder cooling fluid flowing in counter-current on the tube side.

According to the invention, this cooling fluid consists essentially of a mixture of gaseous reagents coming partly from the outside by means of the duct 27 and partly from the underlying heat exchanger 29 in which they have been partially heated as explained more fully below.

The reaction mixture thus cooled is then fed to the next catalyst bed 12 after flowing within the airspace 25.

From catalyst bed 12, which is crossed by a centripetal axial-radial flow, emerges a second reaction mixture further enriched with reaction products which is fed through the gas path 34 to the heat exchanger 29, wherein it is partially cooled by indirect heat exchange before being sent to the third and last catalyst bed 13.

According to the present invention, the partial cooling of the reaction mixture leaving the second catalyst bed 12, flowing shell side in the heat exchanger 29, takes place by means of a colder cooling fluid flowing in counter-current on the tube side.

In accordance with the present invention, this cooling fluid consists essentially of cold gaseous reagents coming from the outside by means of the duct or ducts 38.

The reaction mixture thus cooled is then fed to the next and last catalyst bed 13 after flowing within the annular airspace 35.

From the catalyst bed 13, also crossed by a centripetal axial-radial gas flow, emerges a final reaction mixture which is sent through the central duct 9 to the heat exchanger 7 before its final withdrawal from the reactor 1 by means of the opening 10.

Obviously, the heat of the reaction mixture leaving the reactor can be further exploited to heat another fluid or preheat the cold gaseous reagents in other heat exchange equipments provided upstream of the reactor. Among the advantages achievable thanks to the modernization method of the present invention, the easy control of the various coolings performed by means of the heat exchangers 18 and 29 and performed by adjusting the flow rates of the cold gaseous reagents sent to the tube side thereof stands out.

More particularly, the cooling degree of the reaction products leaving the first catalyst bed 11 in the heat exchanger 18, can be controlled in an extremely flexible manner by appropriately mixing the cold gaseous reagents coming from outside the reactor with those already preheated in the underlying heat exchanger 29.

Particular advantages of flexibility and quickness of adjustment were also observed when 20% to 40% of the total flow of the cooling gas fed to the heat exchanger 18 is made up of cold gaseous reagents sent through duct 27.

In the non-limitative Example 1 given hereinbelow, the conversion yields achievable by a reactor modernised by the method of the present invention are compared with those achievable in accordance with the known art.

EXAMPLE 1

The conversion yield achievable by a conventional Kellogg reactor (Reactor A) was compared with that achievable by a reactor modernised in accordance with the method proposed by prior U.S. Pat No. 5,254,316 (Reactor B) and by a rector modernised in accordance with the method of the present invention (Reactor C).

In the three reactors considered, there was provided a distribution of the catalyst volumes set forth in the following Table I.

TABLE I

| | Catalyst volume (m³) | | |
|---|---|---|---|
| Bed No. | A | B | C |
| 1° | 9.2 | 8.00 | 8.00 |
| 2° | 13.7 | 12.7 | 13.00 |
| 3° | 19.1 | 52.00 | 48.00 |
| 4° | 30.7 | 0.0 | 0.0 |

The composition of the gases fed to the reactors and the operating conditions considered were the following:

| Inlet gas composition: | |
|---|---|
| $H_2$ | 69.01 |
| $N_2$ | 23.00 |
| $NH_3$ | 1.85 |
| $CH_4$ | 3.84 |
| Ar | 2.30 |

Operating Conditions:

Reactor outlet pressure: 145 bar

Quench gas temperature: 142° C.

Production capacity: 1156 MTD $NH_3$

By means of a consolidated kinetic model as described by D. C. Dyson et al. in "A kinetic expression with diffusion correction for ammonia synthesis on industrial catalyst", I & EC Fundamentals, 7(4): 605–610, (1968), the conversion data ( in terms of molar % ) were then determined downstream of each of the catalyst beds of the reactor.

TABLE II

| | Conversion (mol %) | | |
|---|---|---|---|
| Bed No. | A | B | C |
| inlet 1° | 1.85 | 1.85 | 1.85 |
| outlet 1° | 12.22 | 11.23 | 10.66 |
| inlet 2° | 7.98 | 8.73 | 10.66 |
| outlet 2° | 14.38 | 13.79 | 14.72 |
| inlet 3° | 10.87 | 13.79 | 14.72 |
| outlet 3° | 15.57 | 19.46 | 19.73 |
| inlet 4° | 13.21 | 0.0 | 0.0 |
| outlet 4° | 17.54 | 0.0 | 0.0 |

From the data set forth in the tables above, it is clear that the reactor modernised/in accordance with the present invention allows to achieve a further and unhoped-for increase of the conversion yield over that obtainable by the retrofitting method in accordance with the known art.

This increased conversion yield reaches 99% of the maximum theoretically achievable (19.9 mol%) by a brand new three-bed catalyst reactor having the same catalyst volumes.

Finally, it should be noted that this result is all the more appreciable in an area where even minimal conversion yield increases result in substantial benefits from the technical (reduction of recycle flow rates to the reactor) and economical viewpoint.

The following advantages are achieved by the modernization method of the present invention:

optimal exploitation of the volumes inside the reactor used to house either the catalyst or the heat exchangers 18 and 29 for indirect cooling of the reaction mixtures between the catalyst beds, achievement of an extremely advantageous thermodynamic configuration, by reaching an unhoped-for further increase in the conversion yield achievable from a preexisting heterogeneous exothermic synthesis reactor, and possibility of adjusting the temperature of the reaction mixtures flowing between the catalyst beds in an extremely flexible and effective manner by regulating the flow rate of the cold gaseous reagents fed on the tube side into the exchangers 18 and 29.

We claim:

1. Method for in-situ modernization of a heterogeneous exothermic synthesis reactor including an external shell (2) in which a plurality of superimposed catalyst beds (L1–L4) in mutually spaced relationship are supported, the reactor being provided with a first gas-gas heat exchanger (7) for cooling the reaction products leaving the lowermost catalyst bed, said method comprising the steps of:

providing a first (11) and a second (12) catalyst bed in an upper portion (2a) of said shell (2) and at least a third bed (13) in a lower portion (2b) thereof, equipping each of said beds (11, 12, 13) with means for feeding to each bed a radial or axial-radial flow of reagent gasses, and providing a second gas/gas heat exchanger (18) between said first (11) and second (12) catalyst beds, providing means for indirect cooling of the basses flowing between said first (11) and second (12) catalyst beds in the second heat exchanger (18), providing a third gas/gas heat exchanger (29) in said third catalyst bed (13), and providing means for indirect cooling of the basses flowing between said second (12) and third (13) catalyst beds in the third heat exchanger (29).

2. Method according to claim 1, wherein said first gas-gas heat exchanger (7) is supported within a cover (3) of said shell (2).

3. Method according to claim 21, wherein said second heat exchanger (18) is provided in and coaxially with said first (11) and second (12) catalyst beds.

4. Method according to claim 1, wherein said third heat exchanger (29) is provided in and coaxially with said third catalyst bed (13).

5. Method according to claim 1, wherein said second (18) and third (29) heat exchangers are connected in series with one another on the tube side.

6. Method according to claim 1, wherein said means for indirect cooling of the gasses flowing between said first (11) and second (12) catalyst beds comprises:

a first tube nest (19) equipped with opposed gas inlet (20) and outlet (21) openings on the shell side, said openings (20, 21) being in fluid communication respectively with said first (11) and second (12) catalyst beds, and means (27) for feeding fresh gaseous reagents to a gas inlet opening (23) on the tube side of said first tube nest (19).

7. Method according to claim 1, wherein said means for indirect cooling of the gasses flowing between said second (12) and third (13) catalyst beds comprises:

a second tube nest (30) equipped with opposed gas inlet (32) and outlet (33) openings on the shell side, said openings (32, 33) being in fluid communication respectively with said second (12) and third (13) catalyst beds, and means (38) for feeding fresh gaseous reagents to a gas inlet opening (37) on the tube side of said second tube nest (30).

8. Heterogeneous exothermic synthesis reactor comprising:

an external shell (2), a first (11) and a second (12) catalyst bed extending in an upper portion (2a) of said shell (2), at least a third catalyst bed (13) extending in a lower portion (2b) of said shell (2), each of said beds (11, 12, 13) being supported by respective annular baskets (14, 15, 160 equipped with opposed gas-permeable gas inlet and outlet walls, a first gas-gas heat exchanger (7) for cooling the reaction products leaving the lowermost catalyst bed (13), a second gas-gas heat exchanger (18) coaxially extending in said first (11) and second (12) catalyst beds, said second heat exchanger (18) being equipped with respective second means for indirect cooling of the basses flowing between said first (11) and second (12) catalyst beds; and a third gas-gas heat exchanger (29), coaxially extending in said third catalyst bed (13) and equipped with respective third means for indirect cooling of the bases flowing between said second (12) and third (13) catalyst beds.

9. Reactor according to claim 8, wherein said first gas-gas heat exchanger (7) is supported within a bell-shaped cover (3) of said shell (2).

10. Reactor according to claim 8, wherein said second means for indirect cooling of the gasses leaving said first catalyst bed (11) comprises:

a first tube nest (19) equipped with opposed gas inlet (20) and outlet (21) openings on the shell side, said openings (20., 21) being in fluid communication respectively with said first (11) and second (12) catalyst beds, and means for feeding fresh gaseous reagents to a gas inlet opening (23) on the tube side of said first tube nest (19).

11. Reactor according to claim 8, wherein said gas inlet opening (20) on the shell side in said first tube nest (19) is in fluid communication with the first catalyst bed (11) through a first annular airspace (24), defined between said first tube nest (19) and the gas outlet wall of the support basket (14) for said first catalyst bed (11).

12. Reactor according to claim 8, wherein said gas outlet opening (21) on the shell side from said first tube nest (19) is in fluid communication with said second catalyst bed (12) through a second annular airspace (25), defined between said first tube nest (19) and a coaxial wall (26) extending between said tube nest (19) and said second catalyst bed (12).

13. Reactor according to claim 8, wherein said third means for indirect cooling of the basses flowing between said second (12) and third (13) catalyst beds comprises:

a second tube nest (30) equipped with opposed gas inlet (32) and outlet (33) openings on the shell side, said openings (32, 33) being in fluid communication respectively with said second (12) and third (13) catalyst beds, and means for feeding fresh gaseous reagents to a gas inlet opening (37) on the tube side of said second tube nest (30).

14. Reactor according to claim 13, wherein said second catalyst bed (12) is in fluid communication with said gas inlet opening (32) on the shell side of said second tube nest (30) through an essentially annular gas passage (34), extending coaxially within the reactor between the second catalyst bed (12) and the second tube nest (30).

15. Reactor according to claim 13, wherein said gas outlet opening (33) on the shell side from said second tube nest (30) is in fluid communication with the third catalyst bed (13) through a third annular airspace (35), defined between said second tube next (30) and a coaxial wall (36) extending between said tube nest (30) and said third catalyst bed (13).

16. Reactor according to claim 8, wherein said second and third heat exchangers (18, 29) are interconnected in series on the tube side.

17. Method for effecting high-yield heterogeneous exothermic synthesis reactions comprising the steps of:

feeding gaseous reagents to a synthesis reactor in which at least three superimposed catalyst beds (11, 12, 13) in mutually spaced relationship are supported within a shell (2), reacting said gaseous reagents in said catalyst beds (11, 12, 13), preheating said gaseous reagents in a first gas-gas heat exchanger (7) upstream of the first catalyst bed (11), feeding the preheated gaseous reagents to the first catalyst bed (11), feeding the reaction mixture leaving the first catalyst bed (11) to a second heat exchanger (18) extending coaxially in said first (11) and second (12) catalyst beds, cooling said reaction mixture in said second heat exchanger (18), feeding the cooled reaction mixture thus obtained to the second catalyst bed (13), cooling said reaction mixture in said third heat exchanger (29), feeding the cooled reaction mixture thus obtained to the last one (13) of said catalyst beds (11, 12, 13) and withdrawing from the synthesis reactor the reaction products leaving the last one of said catalyst beds.

18. Method according to claim 17, wherein said first gas-gas heat exchanger (7) is supported within a bell-shaped cover (3) of said shell (2).

19. Method according to claim 17, wherein the reaction mixtures leaving the first (11) and second (12) catalyst beds are cooled by means of indirect heat exchange with fresh gaseous reagents.

20. Method according to claim 19, wherein the fresh gaseous reagents are fed to the second ( 18 ) and third ( 29 ) heat exchangers according to pre-set flow rates.

21. Method according to claim 19, wherein the reaction mixture leaving the first catalyst bed (11) is cooled by means of indirect heat exchange with a cooling mixture including fresh gaseous reagents and preheated gaseous reagents leaving the third heat exchanger (29).

22. Method according to claim 21, wherein said cooling mixture comprises from 20% to 40% of fresh gaseous reagents.

* * * * *